Figure 1:
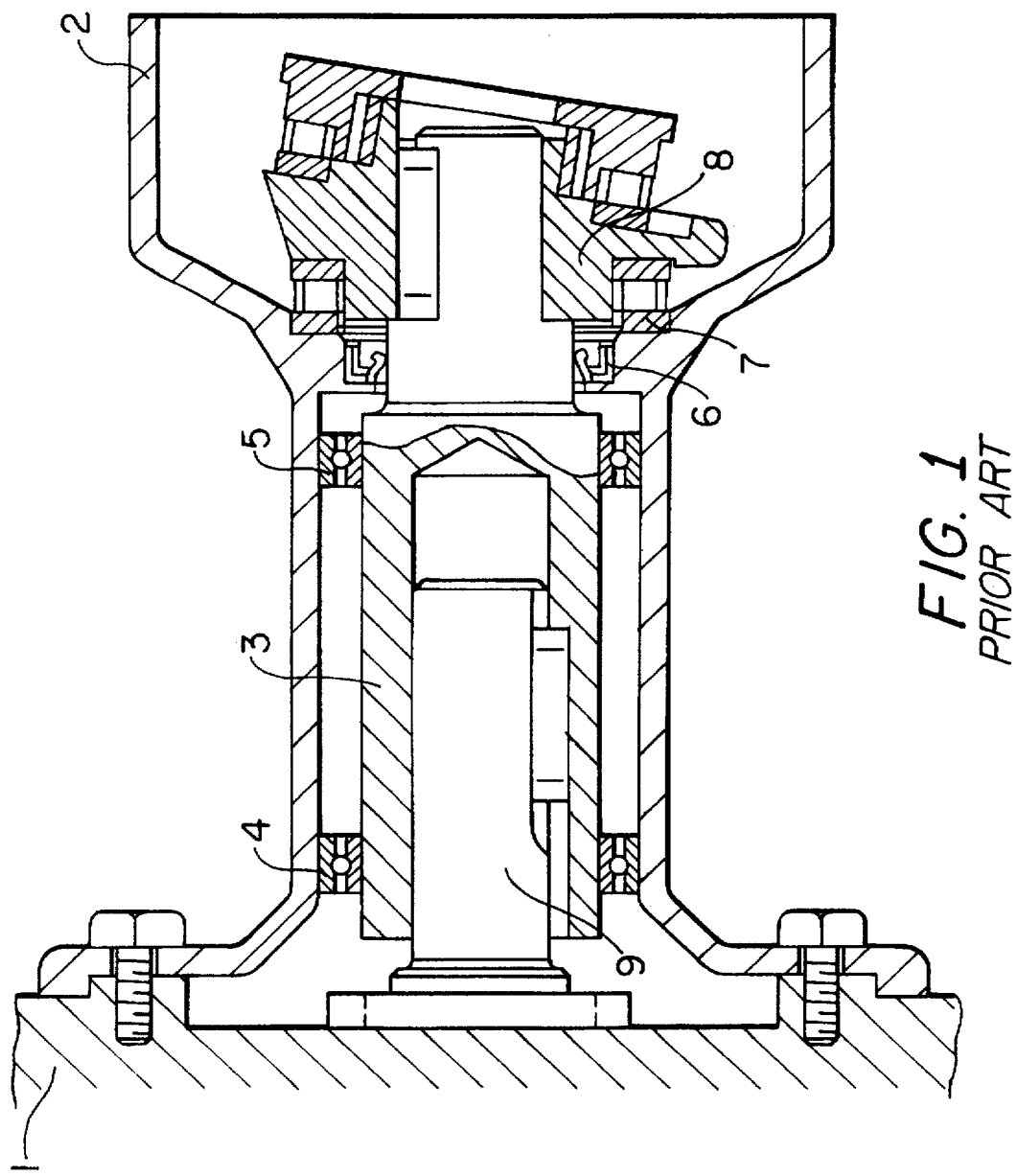

United States Patent [19]

Worm

[11] Patent Number: 5,793,134

[45] Date of Patent: Aug. 11, 1998

[54] DRIVE ARRANGEMENT FOR HIGH-PRESSURE PUMP AND HIGH-PRESSURE CLEANER WITH SUCH A DRIVE ARRANGEMENT

[75] Inventor: Erik Kristensen Worm, Nibe, Denmark

[73] Assignee: Kew Industri A/A, Hadsund, Denmark

[21] Appl. No.: 780,438

[22] Filed: Jan. 8, 1997

[51] Int. Cl.⁶ .................................... H02K 7/06
[52] U.S. Cl. ............................. 310/82; 310/75 R
[58] Field of Search ........................ 310/82, 83, 84, 310/75 R; 417/269, 360, 222.1; 74/60

[56] References Cited

U.S. PATENT DOCUMENTS

| | | | |
|---|---|---|---|
| 2,953,944 | 9/1960 | Sundt | 310/82 |
| 3,428,839 | 2/1969 | Singleton et al. | 310/82 |
| 4,330,725 | 5/1982 | Huntz | 310/82 |
| 5,231,915 | 8/1993 | Shimizu | 417/169 |
| 5,275,087 | 1/1994 | Akuzawa et al. | 417/269 |

*Primary Examiner*—Thomas M. Dougherty
*Assistant Examiner*—B. Mullins
*Attorney, Agent, or Firm*—Larson & Taylor

[57] ABSTRACT

In a drive arrangement for driving a pump of the axial-piston type, of which solely the swash-plate member (8) is shown, from a motor (1), the main novel feature is that the motor shaft (9) is directly connected or connectable to the swash-plate member (8), thus eliminating problems caused by a previously used intermediate shaft between the motor shaft and the swash-plate member.

5 Claims, 2 Drawing Sheets

DRIVE ARRANGEMENT FOR HIGH-PRESSURE PUMP AND HIGH-PRESSURE CLEANER WITH SUCH A DRIVE ARRANGEMENT

The present invention relates to an arrangement for driving a high-pressure pump of the axial-piston type and of the kind comprising a) a housing secured to a rotary motor and adapted to support the housing of said pump, and b) in said housing b1) a drive shaft of said motor, b2) a rotary swash-plate member connected to said shaft and constituting part of said pump of the axial-piston type, and b3) a thrust bearing surrounding said shaft and adapted to carry the axial load imposed by said swash-plate member when in operation.

In previously known arrangements of this kind, the swash-plate member is connected to the motor driving it through an intermediate shaft supported in separate bearings in the housing. The input end of the intermediate shaft comprises an axial bore surrounding the output shaft of the motor and keyed or splined to this shaft, while the output end of the intermediate shaft is keyed or splined to the swash-plate member, the latter being supported against axial loads by a thrust bearing secured in the housing.

This prior-art arrangement suffers from several disadvantages, of which the following may be mentioned:

i) Due to the use of separate bearings for the intermediate shaft, the whole arrangement is statically indeterminate and requires extremely accurate alignment between the bearings for the intermediate shaft and those supporting the motor's drive shaft.

ii) If—as is normally the case—a sealing ring is adapted and located so as to prevent oil from the space surrounding the swash-plate member and the remaining parts of the pump from leaking into the remaining space in the housing, containing i.a. the separate bearings for the intermediate shaft, there is a risk that the splined or keyed connection between the intermediate shaft and the motor's drive shaft can corrode (rust), thus making it well-nigh impossible to disconnect the intermediate shaft from the motor's drive shaft.

iii) The use of an intermediate shaft makes it necessary to use a housing of considerable axial extent, thus requiring a corresponding amount of space, as well as exposing the housing to high mechanical stress.

It is the object of the present invention to provide an arrangement of the kind described above, in which the disadvantages referred to above are eliminated, and this object is achieved by an improvement comprising c) that said shaft protrudes unsupportedly from said motor and is directly connected to said swash-plate member.

In the following detailed part of the present description, the invention will be explained in more detail with reference to the exemplary embodiment of a drive arrangement according to the invention shown in the drawing, FIG. 1 showing an example of the prior-art arrangement described above, and FIG. 2 showing an exemplary embodiment of an arrangement according to the present invention, Both figures being longitudinal sectional views.

The prior-art arrangement shown in FIG. 1 comprises a motor 1, a housing 2 mounted on said motor 1 on the end of the latter, from which a drive shaft 9 extends, an intermediate shaft 3 keyed onto the drive shaft 9 and supported in bearings 4 and 5, and at the opposite end keyed to a swash-plate member 8 constituting part of a pump of the so-called axial-piston type, said member 8 being axially supported in the housing 2 by a thrust bearing 7, and sealed by a sealing ring 6.

The part of the housing 2 facing towards the right in FIG. 1 is adapted to be connected to a further housing constituting a pump housing accommodating the remaining parts of the pump, such as the cylinders, pistons, valves (if any) etc., all adapted to co-operate in a well-known manner with the swash-plate member 8 to make the pistons reciprocate when the member rotates. Persons skilled in this art will know how to devise and arrange such a pump.

In operation, the right-hand part of the housing 2 will —together with the co-operating pump housing—normally contain a quantity of oil; this is why the sealing ring 6 is used.

The presence of the sealing ring 6 will, of course, prevent oil from penetrating into the space containing the bearings 4 and 5 as well as the input part of the intermediate shaft 3 keyed to the drive shaft 9 of the motor 1. This means that any oil or grease (if at all used) initially used when fitting the intermediate shaft 3 onto the drive shaft 9 will not be replaced as it gradually evaporates due to the heat from the motor 1, possibly also from the pump comprising the swash-plate member 8. This means again that corrosion may occur in the joint between the intermediate shaft 3 and the drive shaft 9, making it difficult or impossible to disengage these two parts from each other.

The heat from the motor 1 and possibly from the pump may also in the long run cause the lubricant in the bearings 4 and 5 to evaporate, so that they will eventually run dry.

Looking at FIG. 1 and considering the fact that the motor 1 will normally have at least two bearings supporting the shaft 9, it will be seen that the arrangement comprising these at least two motor bearings and the two bearings 4 and 5 in the housing 2 is a statically indeterminate arrangement having at least "two bearings too many" to be statically determinate. Thus, to avoid periodic flexing loads on the intermediate shaft 3 and the drive shaft 9, extremely accurate alignment is necessary.

Figure 2:
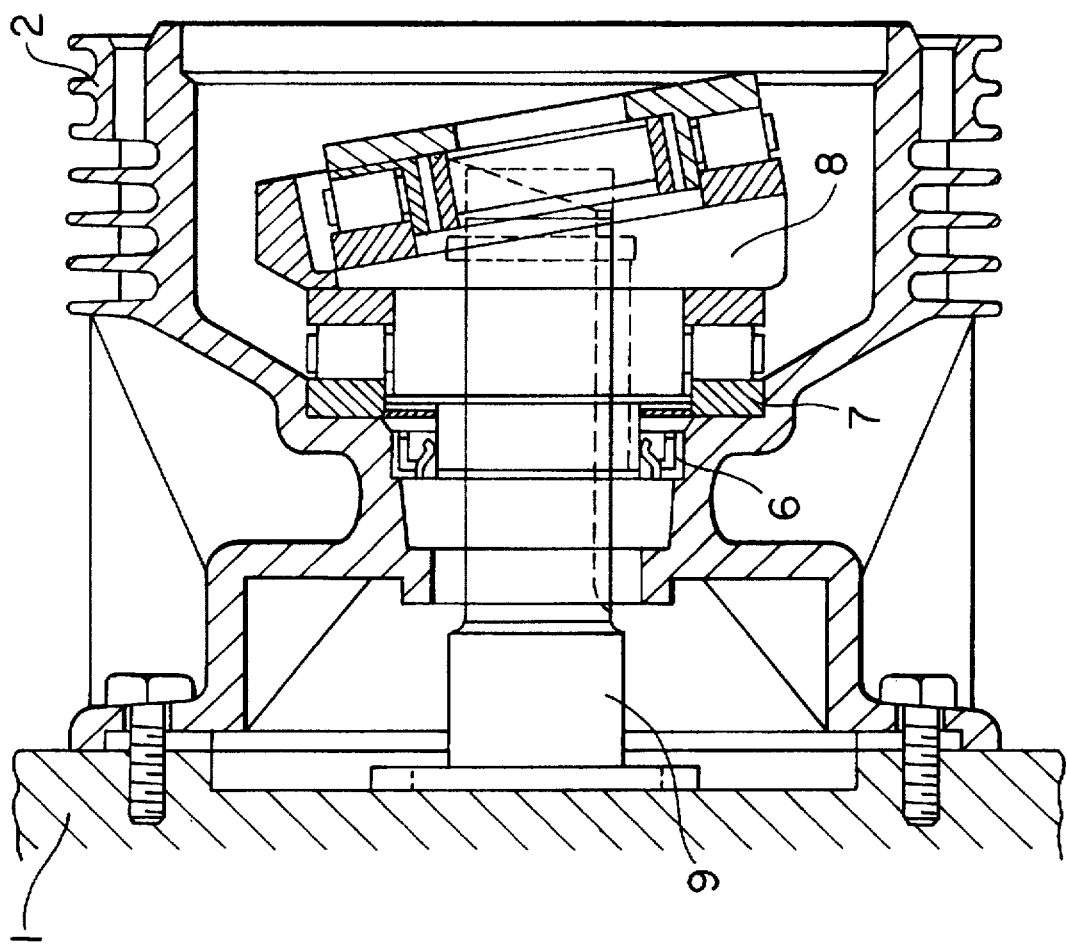

Now, looking at FIG. 2 showing an exemplary embodiment of a drive arrangement according to the present invention, it will be seen that the intermediate shaft 3 and the bearings 4 and 5 of FIG. 1 have been dispensed with, that the housing 2 has been considerably shortened, and that the drive shaft 9 of the motor 1 now engages the swash-plate member 8 directly. Thus, the disadvantages associated with the use of the intermediate shaft 3 and its bearings 4 and 5 have been eliminated.

The connection between the drive shaft 9 and the swash-plate member 8 is preferably releasable and may be constituted by a spline connection or the like. A person skilled in this art will know how to devise and construct such a connection to make it possible to remove bodily the housing 2 together with the pump housing (not shown) from the motor 1 and replacing same again so as to re-establish the drive connection between the drive shaft 9 and the swash-plate member 8.

As will be obvious when comparing FIG. 2 to FIG. 1, the drive arrangement according to the present invention can be made considerably shorter in the axial direction than that of the prior art.

The drive arrangement according to the present invention is intended for use with high-pressure cleaners of the type comprising a cleaning gun with a nozzle adapted to eject cleaning liquid at a high velocity, said cleaning liquid being supplied by the axial-piston pump driven by the drive arrangement referred to. As will be known by persons skilled in the art of making and using high-pressure cleaners, it is important that such cleaners take up as little space as possible, are reliable in operation and are easy to maintain. Further, they should not comprise parts that are not strictly necessary, so as to keep the cost within acceptable limits for the numerous users of such cleaners. It is believed that the present drive arrangement represents a substantial step towards fulfilling these conditions.

The present invention is primarily intended for use with a motor 1 of the internal-combustion type, but it will be obvious that the novel effect achieved by means of the invention does not depend on the type of motor used, provided that it has a rotary output shaft.

| LIST OF PARTS | |
|---|---|
| 1 | Motor |
| 2 | Housing |
| 3 | Intermediate shaft |
| 4 | Bearing |
| 5 | Bearing |
| 6 | Sealing ring |
| 7 | Thrust bearing |
| 8 | Swash-plate member |
| 9 | Drive shaft |

I claim:

1. Apparatus for driving a high-pressure pump of the axial-piston type comprising:
    a motor having a plurality of motor bearings and a drive shaft, said drive shaft being supported by said motor bearings and protruding outwardly of said motor;
    a housing secured to said rotary motor
    said drive shaft extending into said housing,
    a rotary swash-plate member in said housing constituting part of a pump of the axial-piston type, means for directly connecting said swash-plate member to said drive shaft for rotation therewith, and
    a thrust bearing in said housing surrounding said shaft for carrying an axial load imposed by said swash-plate member when in operation,
    said shaft having no shaft support bearings other than said motor bearings.

2. Apparatus according to claim 1, wherein said swash-plate member is supported for rotation solely by said drive shaft.

3. Apparatus according to claim 1, wherein said connecting means comprise means for coupling and uncoupling said swash-plate and drive shaft by relative axial movement thereof.

4. Apparatus according to claim 1 further comprising a seal isolating a space in said housing facing said motor from a space in said housing in which said swash-plate member is located, said sealing ring being located to provide a seal between said spaces by bridging a gap between said housing and said drive shaft and/or said swash-plate member.

5. A high-pressure cleaner comprising an axial piston pump for delivering cleaning fluid at a high pressure, said pump having a rotary swash-plate member for actuating at least one piston, and a drive for driving said pump, said drive comprising a motor having a plurality of motor bearings and a drive shaft, said drive shaft being supported by said motor bearings and protruding outwardly of said motor, a housing secured to said rotary motor, said drive shaft extending into said housing, a rotary swash-plate member in said housing constituting part of said pump, means for directly connecting said swash-plate member to said drive shaft for rotation therewith, and
    a thrust bearing in said housing surrounding said shaft for carrying an axial load imposed by said swash-plate member when in operation,
    said shaft having no shaft support bearings other than said motor bearings.

* * * * *

UNITED STATES PATENT AND TRADEMARK OFFICE
CERTIFICATE OF CORRECTION

PATENT NO. : 5,793,134
DATED : August 11, 1998
INVENTOR(S) : WORM

It is certified that error appears in the above-indentified patent and that said Letters Patent is hereby corrected as shown below:

On the title page, item:

[73] Assignee: Kew Industri A/S, Hadsund, Denmark

Signed and Sealed this

Twenty-third Day of February, 1999

Attest:

Q. TODD DICKINSON

Attesting Officer

Acting Commissioner of Patents and Trademarks